UNITED STATES PATENT OFFICE.

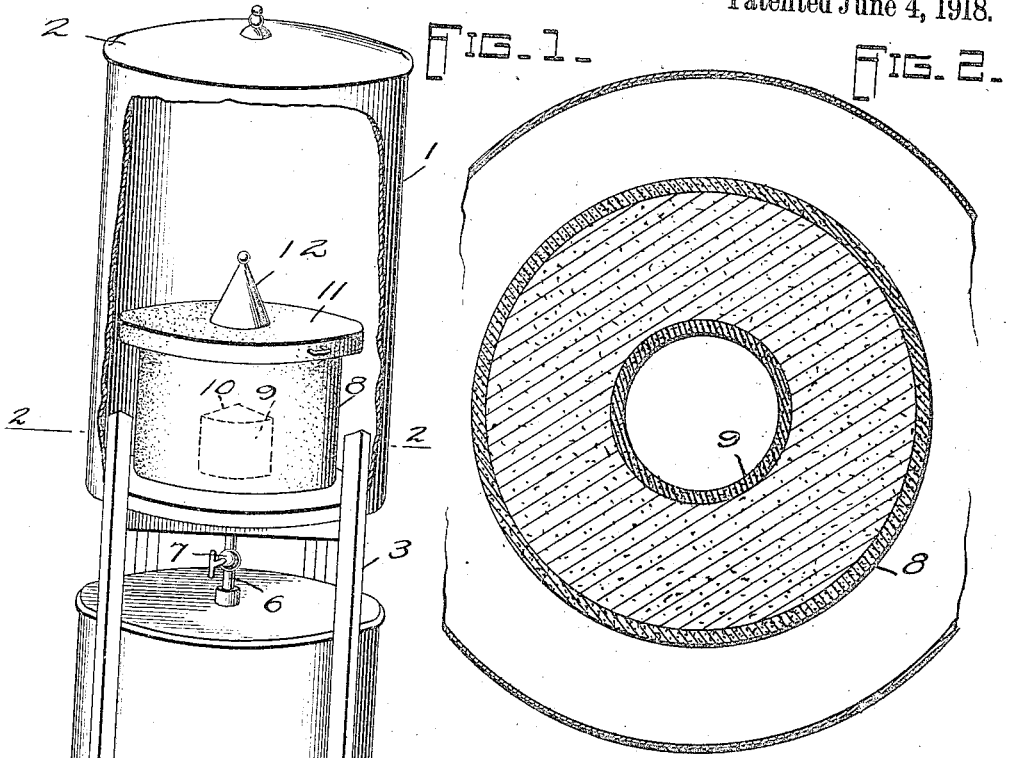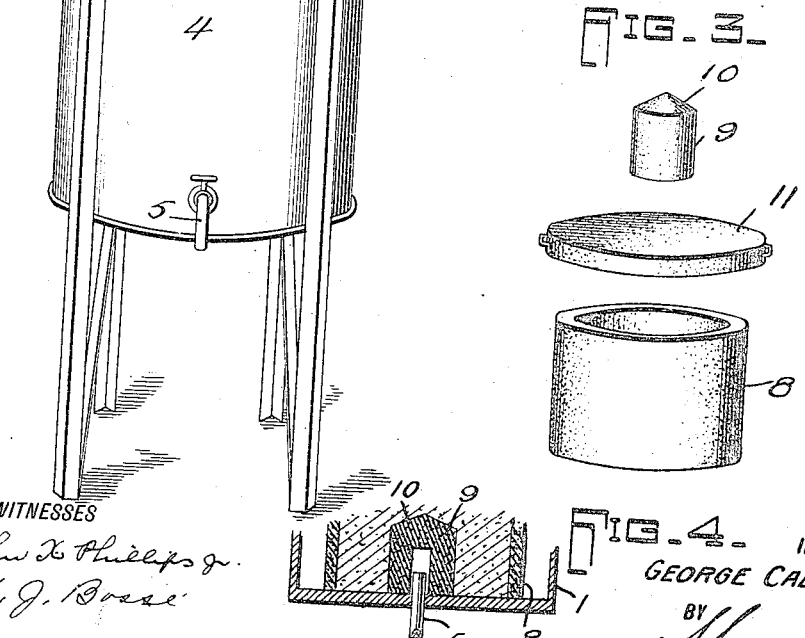

GEORGE CAEN, SR., OF SAN ANTONIO, TEXAS.

GASOLENE AND OIL FILTER.

1,268,431.  Specification of Letters Patent.  Patented June 4, 1918.

Application filed August 28, 1917. Serial No. 188,677.

*To all whom it may concern:*

Be it known that I, GEORGE CAEN, Sr., a citizen of the United States, and a resident of San Antonio, in the county of Bexar and State of Texas, have invented new and useful Improvements in Gasolene and Oil Filters, of which the following is a specification.

My invention is an improvement in gasolene and oil filters, and has for its object to provide a device of the character specified, for freeing soiled gasolene, oil and the like from impurities, and putting the said products into condition for reuse.

In the drawings:

Figure 1 is a perspective view of the renovator;

Fig. 2 is a section on the line 2—2 of Fig. 1;

Fig. 3 is a perspective view showing the parts of the filter separated;

Fig. 4 is a partial transverse vertical section.

In the present embodiment of the invention, the improved filter is arranged in a casing 1 of suitable size, the said casing having an opening in its top which may be closed by a cover 2. In practice, the casing is mounted on a stand 3, which also holds a tank or reservoir 4. This tank or reservoir has a discharge valve 5 at its bottom, and an inlet pipe 6 at its top, which is controlled by a valve 7.

The filter comprises an outer cylinder 8 composed of a porous carbon compound, the said cylinder being open at its top, and an inner cylinder 9 of the same material having its top closed, however, is indicated at 10. These cylinders are seated on the bottom of the container 1 in concentric relation, and the top of the cylinder 8 is closed by a disk 11 of porous carbon compound, the said disk seating on the top of the cylinder 8. The space between the cylinders 8 and 9 is filled with a filtering compound, and the inlet pipe 6 of the tank or reservoir 4 extends through the bottom of the container 1 within the cylinder 9. This pipe 6 is soldered or otherwise secured to the container 1, and extends into the cylinder 9 slightly above the bottom of the container 1. In practice, the opening 2 in the top of the container 1 is of a size to permit the removal of the cylinders 8 and 9.

Gasolene to be renovated is poured into the container 1 through the opening 2. The oil or gasolene passes through the wall of the cylinder 8, and through the disk 11 into the cylinder 8, and through the filtering compound, and afterward through the wall of the cylinder 9 and the top 10 thereof into the space within the cylinder, where it may be drawn off through the pipe 6 into the tank or receptacle.

The filter removes all particles in suspension from gasolene, kerosene and distillate oils, thereby enabling the gasolene and the like to be reused. It also increases the efficiency of the engine in which the fuel is used by eliminating the possibility of clogged needle valves. Lubricating oils may be also reclaimed in the same manner. As shown in Fig. 1, a shed 12, of conical form, is seated on the plate or disk 11, at the center thereof, to deflect the oil or gasolene to all parts of the filter.

I claim:

1. A device of the character specified, comprising a casing, and a filter in the casing, said filter comprising inner and outer cylinders of porous carbon, the top of the inner cylinder being closed, and a disk for closing the top of the outer cylinder.

2. A device of the character specified, comprising a casing, and a filter in the casing, said filter comprising inner and outer cylinders of porous carbon, the inner cylinder having a closed top, and a removable top for the outer cylinder.

3. A filter comprising inner and outer cylinders of porous carbon, the top of the inner cylinder being closed, and a removable top for the outer cylinder.

GEORGE CAEN, SR.

Copies of this patent may be obtained for five cents each, by addressing the "Commissioner of Patents, Washington, D. C."